March 29, 1949.　　　H. C. BERTELE　　　2,465,421
STARTING AND CONTROL ARRANGEMENT FOR
ELECTRIC DISCHARGE APPARATUS
Filed April 14, 1948　　　　　　　2 Sheets-Sheet 1
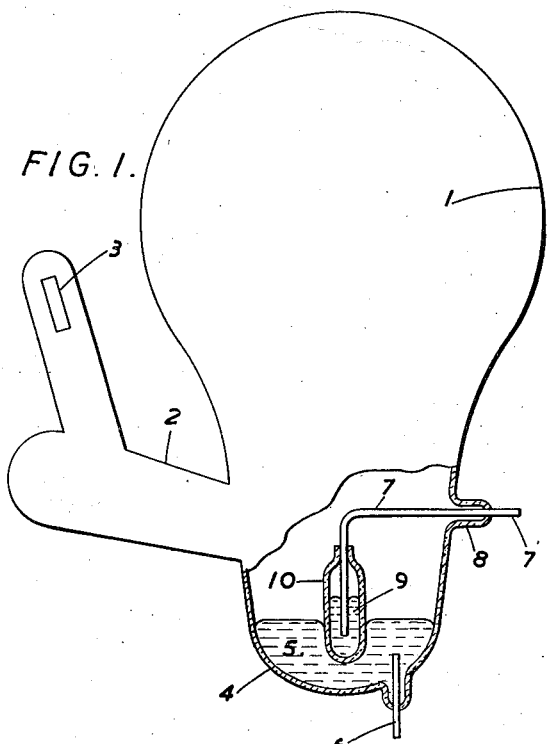
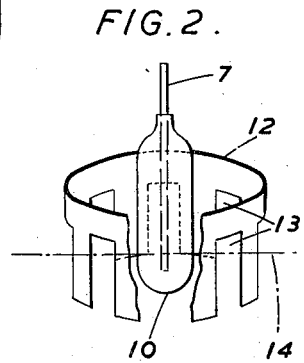
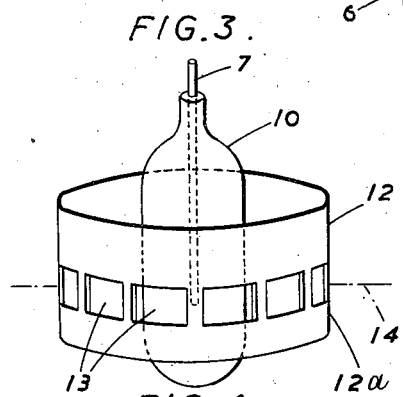
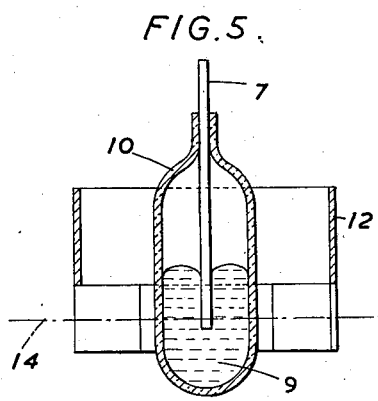
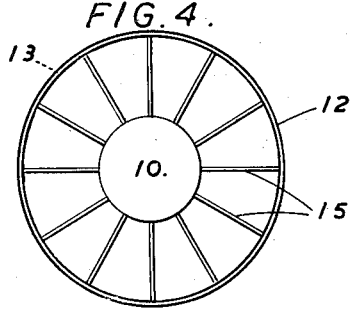
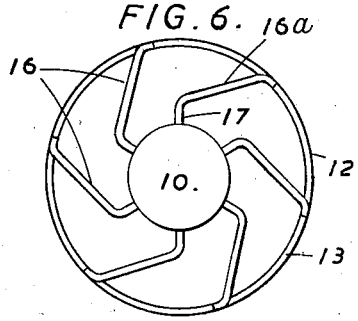
INVENTOR
HANS C. BERTELE
By
ATTORNEY.

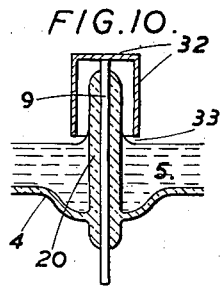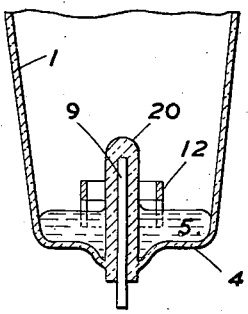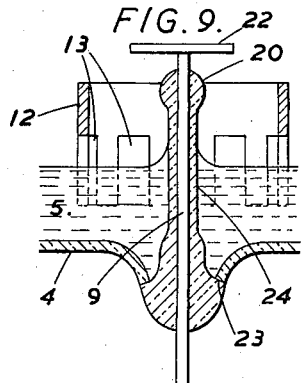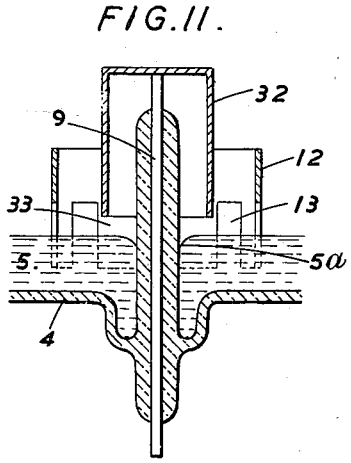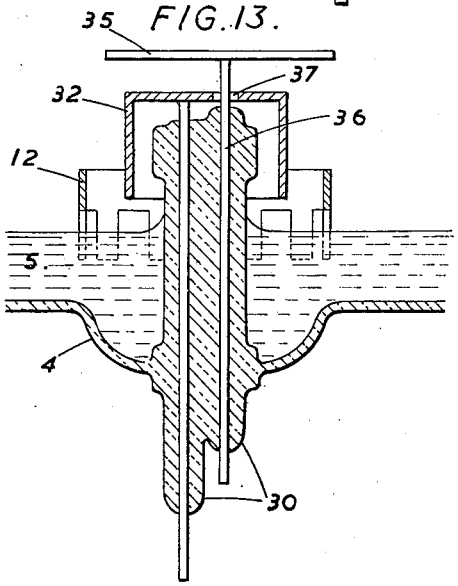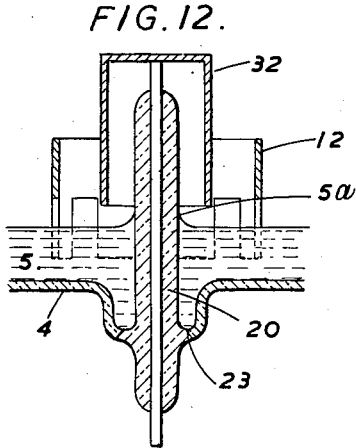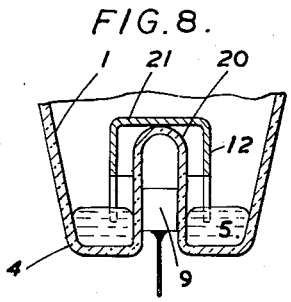

Patented Mar. 29, 1949

2,465,421

UNITED STATES PATENT OFFICE 2,465,421

STARTING AND CONTROL ARRANGEMENT FOR ELECTRIC DISCHARGE APPARATUS

Hans Carl Bertele, Purley, England

Application April 14, 1948, Serial No. 20,974
In Great Britain April 21, 1947

10 Claims. (Cl. 250—27.5)

This invention relates to starting or ignition and control devices for metal vapour electric discharge apparatus, and more particularly for mercury vapour valves of the arc type including a cathode formed by a pool of liquid mercury.

Known methods of ignition for such valves consist in applying momentary electric oscillating fields between the liquid mercury and an ignition electrode separated therefrom by a suitable insulating material such as quartz. The ignition electrode may be external to the envelope, in which case the cathode pool container itself acts as the intermediate insulator, or such insulated electrode may be within the vacuum system and partially immersed in the liquid mercury.

The principal object of the present invention is to reduce the destructive effects of the arc and of the hot mercury vapour on the insulation material between the ignition electrode and the mercury pool which occur especially when the system is to be used for ignition at every period in order to dispense with separate exciter and, it may be also control, electrodes.

A starting or ignition system for a metal vapour electric discharge apparatus of the type having a cathode formed by a liquid pool according to the invention comprises in combination an igniting electrode having an insulating sheath which is bathed by the cathode liquid and a ring or shield of arc-resisting non-sputtering metal provided around but spaced from such sheath inducing the outward movement of the initial arc-spot from the sheath, the ring also affording space above the cathode liquid for the continued outward movement of the arc-spot along the surface of the pool and the ring thereafter shielding the sheath against radiation from the arc.

The ring or shield is preferably of a metal such as molybdenum or tungsten that is arc-resistant and not sputtered by ion bombardment from the arc and may be at the same potential as and mounted on the starting electrode or may be at the potential of the cathode pool by being in contact therewith in which latter event the ring is interrupted at intervals at the surface of the pool to permit the outward movement of the arc spot along such surface after each ignition.

The igniting electrode may be within the valve envelope in which case it is enclosed in a quartz bulb or, advantageously a bulb of alkali free glass or glass of low alkali content suitable to resist hot mercury vapour and durable under working conditions, and hereafter referred to as alkali-free glass. The electrode may position or be positioned by the shield, or it may be external to the valve in which case it is located in an inverted insulating cup which forms part of the valve envelope and projects upwardly through the surface of the cathode where it may carry the shield.

As applied to mercury arc rectifier valves, the shield, when it has its lower portion immersed in the mercury pool, is interrupted by slots or is castellated at the liquid surface so as to afford communication between the surface of the mercury within the shield and that around it for the outward movement of the arc-spot.

The shield or ring may include an annular portion or upper flange spaced from the sheath and above the mercury pool to protect the anodes and grids if present from the effects of the D. C. arc and of the intense streams of vapour which occur during the valve de-gassing process.

The invention will be further described with reference to the accompanying drawings where several embodiments are illustrated diagrammatically by way of example and in which:

Fig. 1 shows a known arrangement of glass-envelope valve and igniting or starter electrode, Figs. 2 to 6 show three forms of shield or ring according to the invention applied to igniting electrodes located inside the envelope while Figs. 7 and 8 show applications to igniting electrodes external to the envelope, Fig. 9 shows an external starter electrode which protrudes into the valve envelope, Fig. 10 shows a shield mounted on an extension of the igniting electrode, and Figs. 11 to 13 show two-stage or cascade arrangements each employing a pair of concentric shields.

Referring now to the drawings and first more particularly to Fig. 1, a mercury vapour rectifier valve of a known type is shown having a glass envelope 1 formed with a lateral arm 2 of which there may be two or more, each carrying an anode 3. The lower portion of the envelope 1 is formed as a container 4 for a mercury cathode pool 5 which is connected to the circuit through a terminal 6.

An igniting electrode is supported by a rigid lead 7 which passes through a gas-tight seal 8 in the envelope. This electrode is formed by a small quantity of mercury 9 enclosed in a quartz or arc-resisting glass bulb 10 sealed to the lead 7, and partly immersed in the cathode pool 5, mercury being more suitable as the igniting electrode than a solid conducting body in that it adheres accurately to the inner surface of the bulb 10.

It should be noted that in ignition electrodes of the type in question it is important that the wall thickness of the bulb 10 or equivalent insulating sheath at the surface of the pool should not be more than 1/16 of an inch.

In the succeeding Figs. 2 to 13, which illustrate the present invention, the upper parts of the envelope, the anodes and the cathode lead are omitted for the sake of simplicity, and it will be appreciated that the invention is not only applicable to valves of the general type shown in Fig. 1 by way of example, but also to any other type of vapour discharge apparatus having a glass, metal or composite envelope, any number of anodes, and employing any type of starter electrode operating in conjunction with a cathode pool in the manner described.

Figs. 2 to 6 are detail views of three forms of shield according to the invention located around and spaced from the sheath 10 of the starting electrode 9, of the type shown in Fig. 1, and each including a thin cylindrical molybdenum or tungsten ring 12 provided with apertures 13 at the surface indicated at 14 of the mercury pool 5 and which apertures permit the outward movement of the arc-spot from the surface of the pool at the bulb 10 along such surface to the exterior of the shield 12. In the embodiments shown in Fig. 2 and Figs. 5, 6, the interruptions or apertures 13 are notches in the lower edge of the ring 12, while in the embodiment of Figs. 3 and 4 they are rectangular perforations, the shield having a continuous lower rim 12a in the pool.

The shield 12 may be supported in position by any suitable means formed for example on the bottom of the pool container 4, but preferably it is provided with internal fins whereby it is located on, and held by, the starting electrode sheath 10. Thus in Fig. 4, which is an inverted plan of the construction of Fig. 3, the shield 12 is shown located on the electrode sheath 10 by internal radial fins 15 provided on the shield between the apertures 13. In Figs. 5 and 6 similar fins 16 are formed by bending inwards portions of the lower edge of the shield ring by which operation the apertures or notches 13 are also formed. Furthermore in this latter construction, to augment the protection of the electrode sheath from the effects of radiation and bombardment from the arc spot after it has moved away from the electrode, the fins 16 lie in substantially tangential instead of radial directions and have their inner ends cranked inwardly at 17; thus as the initial arc spot or each spot moves outwardly along a lane defined by two adjacent fins 16, the inwardly directed radiations that would otherwise freely strike the sheath or bulb 10 and deleteriously affect it are increasingly intercepted by the outer face 16a of the one of the pair of fins 16 which lies between the arc spot and the starting electrode.

In the construction shown in Figs. 7 and 8 the starting electrode 9 is external to the valve envelope 1, and is located in an inverted insulating cup 20 forming the sheath and preferably of alkali-free glass forming part of the envelope.

In Fig. 7 the electrode 9 is a rod fitting closely in the cup 20 throughout its length, and the shield 12 employed is of the type shown in Figs. 2 and 5, 6.

The electrode 9 shown in Fig. 8 is a short cylindrical metal plug located in an inverted cup 20 having a relatively large bore, while the shield 12 in this case is also of inverted cup form, having a closed flat top 21 resting on the top of the insulating sheath 20.

In a modification of the arrangement of Fig. 7, which is shown in Fig. 9, the starting electrode 9 is extended upwardly to project through the glass sheath 20, this arrangement having been found to improve the ignition tendency of the system especially when the exposed top of the electrode 9 is furnished with a lateral extension such as a small disc or plate 22.

The insulating cup or sheath 20 is also slightly modified in that it is a separate member of alkali-free glass or quartz sealed to the glass envelope at 23 while also being accurately formed or ground to a reduced diameter over the operative portion 24 to obtain better ignition efficiency.

An uninterrupted space may be provided between the bottom of the shield 12 and the pool surface, in which case the shield may conveniently be supported by, or form a depending skirt around, a disc extension 22 on a starting electrode of the form shown in Fig. 9. Fig. 10 shows such an arrangement in which the shield is formed as a plain inverted cup 32 mounted on, and in metallic contact with, an upward extension of the starting electrode 9, the shield being in this case at ignition electrode potential and not at cathode potential and being separated from the cathode pool 5 by the space which is indicated at 33.

Fig. 11 shows the arrangement of Fig. 10 combined with a concentric shield 12 of larger diameter and of the type shown in Fig. 2 or Figs. 5, 6. In this case the two concentric shields 32 and 12 co-operate to remove the arc-spot from the insulating sheath 20 in stages, the inner shield 32, which is at starter potential, displacing the arc-spot to the annular space between the two shields wherefrom the outer shield 12, which is at cathode potential, forces the arc-spot outwardly through its apertures 13. It will be noted that in this example, as in the case of Fig. 8, the outer surface of the insulating sleeve or cup 20 has not been roughened or matted at the surface of the cathode pool, due to which the latter presents a convex meniscus edge 5a thereat in contradistinction to the concave meniscus caused by wetting and shown in most other examples.

Fig. 12 shows a further embodiment which is similar to that of Fig. 11 except in that the sheath 20 is a separate glass member sealed to the envelope at 23 and the meniscus edge at 5a is concave.

Lastly Fig. 13 shows an arrangement such as those of Figs. 11 and 12 modified by the addition of an auxiliary disc-shaped screen electrode 35 which is adapted to assist in maintaining the main arc and is insluated from both shields and from the cathode. This auxiliary electrode is mounted on a terminal rod 36 sealed in an enlarged insulating sheath 30 parallel with the starting electrode 9 and passing freely without contact through an aperture 37 in the top of the inner shield 32. The electrode 35 and shield 32 are mounted eccentrically on their supports so as to be concentric with each other and with the outer shield 12.

Where the pool container 4, and it may be the envelope 1, is or are of metal, and an external ignition electrode 9 is employed, the insulating electrode sheath 20 or 30 may be sealed thereto at its base, and furthermore the apparatus may incorporate the arc-fixing and cooling arrangements described in co-pending patent application Serial No. 20,424, filed April 12, 1948. It will also be appreciated that a shield of the kind indicated at 32 in Figs. 10 to 13 may be mounted on the lead 7 of an igniting electrode of the type shown in Figs. 2 to 6.

Although ignition may be effected by applying oscillating electric voltages between the cathode pool and the electrode as already known, single tension peaks may be employed and may be supplied from any known or appropriate tension peak generator, preferably a saturated peak transformer.

By the present invention improved and durable starting or ignition and control devices for metal vapour electric discharge apparatus are obtained.

What I claim is:

1. An ignition system for a vapour electric discharge apparatus having a cathode formed by a liquid pool comprising in combination an insulating sheath bathed by said cathode liquid, an igniting electrode within said sheath and insulated thereby from the said liquid, and a shield of arc-resisting non-sputtering metal provided around but spaced from such sheath inducing the outward movement of the initial arc-spot from the sheath, the ring also affording space above the cathode liquid for the continued outward movement of the arc-spot along the surface of the pool and the ring thereafter shielding the sheath against radiation from the arc.

2. An ignition system according to claim 1 wherein the arc-resisting non-sputtering shield is of molybdenum.

3. An ignition system according to claim 1 wherein the arc-resisting non-sputtering shield is of tungsten.

4. An ignition system according to claim 1 wherein the shield is mounted on an extension of the igniting electrode and is spaced above the cathode pool to permit outward movement of the arc-spot.

5. An ignition system according to claim 1 wherein the shield is in contact with the cathode pool and is formed with apertures at intervals at the upper surface of the pool to permit the outward movement of the arc-spot along such surface after each ignition.

6. An ignition system according to claim 1 wherein the shield is in contact with the cathode pool, having a peripheral skirt immersed in the pool, and is slotted or ported at the pool surface to permit the outward movement of the arc-spot.

7. An ignition system according to claim 1 wherein the shield is mounted in spaced relation to the ignition electrode by fins projecting inwardly from the shield.

8. An ignition system according to claim 1 wherein the shield is mounted in spaced relation to the ignition electrode by fins projecting inwardly from the shield, and wherein said fins are not radially disposed and further protect the electrode sheath against bombardment from the arc-spot as the latter moves outwardly from such sheath.

9. An ignition system according to claim 1 including an additional shield provided around but spaced from the first shield and also affording space above the cathode liquid for the continued outward movement of the arc spot.

10. An ignition system according to claim 9 wherein the inner shield is mounted on an extension of the ignition electrode and is at the potential thereof, while the outer one is in contact with the cathode pool.

HANS CARL BERTELE.

No references cited.